(12) United States Patent
Zabihi et al.

(10) Patent No.: US 7,453,888 B2
(45) Date of Patent: Nov. 18, 2008

(54) STACKABLE VIRTUAL LOCAL AREA NETWORK PROVISIONING IN BRIDGED NETWORKS

(75) Inventors: Attaullah Zabihi, Ottawa (CA); Denis Armand Proulx, Kanata (CA); Macmohana Singh Virdy, Ottawa (CA); Chuong Ngoc Ngo, Ottawa (CA); Andre Neil Dominic Jacob, Nepean (CA)

(73) Assignee: Alcatel Lucent, Paris (FR)

( * ) Notice: Subject to any disclaimer, the term of this patent is extended or adjusted under 35 U.S.C. 154(b) by 891 days.

(21) Appl. No.: 10/227,863

(22) Filed: Aug. 27, 2002

(65) Prior Publication Data
US 2004/0042454 A1 Mar. 4, 2004

(51) Int. Cl.
H04L 12/56 (2006.01)
(52) U.S. Cl. ...................................... 370/400
(58) Field of Classification Search .................. 370/401, 370/399, 395.53, 392, 409, 410
See application file for complete search history.

(56) References Cited

U.S. PATENT DOCUMENTS

| | | | | |
|---|---|---|---|---|
| 5,825,772 A * | 10/1998 | Dobbins et al. | ............ | 370/396 |
| 6,035,105 A * | 3/2000 | McCloghrie et al. | ........ | 709/236 |
| 6,167,052 A * | 12/2000 | McNeill et al. | ............. | 370/399 |
| 6,304,901 B1 * | 10/2001 | McCloghrie et al. | ........ | 370/392 |
| 6,339,595 B1 | 1/2002 | Rekhter et al. | ............... | 370/392 |
| 6,445,715 B1 * | 9/2002 | Annaamalai et al. | ........ | 370/466 |
| 6,515,969 B1 * | 2/2003 | Smith | ......................... | 370/256 |
| 6,657,951 B1 * | 12/2003 | Carroll et al. | ............... | 370/222 |
| 6,678,241 B1 * | 1/2004 | Gai et al. | ..................... | 370/216 |
| 6,789,121 B2 * | 9/2004 | Lamberton et al. | .......... | 709/227 |
| 6,801,950 B1 * | 10/2004 | O'Keeffe et al. | ............ | 709/238 |
| 6,813,250 B1 * | 11/2004 | Fine et al. | .................... | 370/256 |
| 6,914,905 B1 * | 7/2005 | Yip et al. | ................ | 370/395.53 |
| 6,937,576 B1 * | 8/2005 | Di Benedetto et al. | ...... | 370/256 |

OTHER PUBLICATIONS

"Completel: National Metro Service Deployment", 2002, River Stone Networks Inc., 5200 Great America Parkway, Santa Clara, CA, 95054, U.S.A., Case Study.
"Understanding and Configuring VLAN Trunk Protocol (VTP)", Cisco Systems, Top Issues, LAN Technologies, Document ID #22997.
"Using VlanDirector", VLAN Director 2.1, pp. xiii to C-12.

(Continued)

Primary Examiner—Anh-Vu H Ly (57) ABSTRACT

A method and human-machine interface for backbone Virtual Local Area Network (VLAN) provisioning in bridged networking environments are provided. The method includes steps of provisioning backbone VLAN support on every backbone data transport trunk and by extension of every stackable data trunk port in the associated data transport network. The human-machine interface enables an operator to expediently effect VLAN provisioning abstracting the intricacies of the data transport network over which VLAN services are provisioned. Advantages are derived from backbone VLAN provisioning independent of an underlying in-use active spanning-tree topology. In particular backbone VLANs are provisioned over spanning-tree stand-by designated backbone data transport trunk links and therefore pre-provisioned in the case of spanning-tree re-configuration. Customer VLANs are mapped onto backbone VLANs ensuring data traffic differentiation, and providing standard VLAN identifier portability. Operator VLAN provisioning tasks are lessened via provisions for the selection of all backbone/stackable data transport trunk links/ports in the data transport network in effecting VLAN identifier associations therebetween.

21 Claims, 6 Drawing Sheets

OTHER PUBLICATIONS

"Cisco—Understanding and Configuring VLAN Trunk Protocol (VTP)", Catalyst 2900 Fast Ethernet Switching System, 1996 Cisco Systems, Document ID #10558.

"Fast Ethernet Switching for High-Performance Workgroups, Backbones, and Server Clusters", Data Sheet, Cisco Systems.

"Cisco VLAN Trunk Protocol", Keith McCloghrie, Cisco Systems, pp. 1-6.

"IEEE Standards for Local and Metropolitan Area Networks: Virtual Bridged Local Area Networks", The Institute of Electrical and Electronics Engineers, Inc., IEEE Std 802.1Q-1998, pp. i-199.

* cited by examiner

STACKABLE VIRTUAL LOCAL AREA NETWORK PROVISIONING IN BRIDGED NETWORKS

FIELD OF THE INVENTION

The invention relates to network management and service provisioning, and in particular to reducing overheads in provisioning virtual local area networks services over an infrastructure of bridged networks.

TECHNICAL OVERVIEW

A Local Area Network (LAN) includes a group of data network nodes and various data transport equipment that share, a common communications medium and other data transport resources. Usually, LANs provide data transport services for homes, small businesses and departments within large enterprises.

Most LANs are confined to a single building or group of adjacent buildings. However legacy LANs technology is inadequate in supporting: an ever increasing telecommuting work force, remote office connectivity, decentralized government services, etc. because of a limited reach.

Customer-owned disparate LANs can be interconnected over large distances via dedicated links such as wire and wireless links. Another alternative to disparate LAN interconnectivity can be achieved by connecting each LAN segment to a carrier data transport network. The separate LAN segments are said to be bridged. The Internet is one of the largest public carrier networks. A group of interconnected LANs is referred to as a Wide Area Network (WAN). Nevertheless, customers incur a large overhead in provisioning, managing and maintaining disparate LANs.

Data carrier networks can be said to provide connection-less and connection-oriented data transport services. The Internet is the largest connection-less data transport network typically employing the Internet Protocol to convey packets. Selected portions of the Internet, provisioned by certain service providers, offer connection-oriented data transport typically employing exemplary technologies such as Asynchronous Transfer Mode (ATM) and Multi-Protocol Label Switching (MPLS). Various other data transport technologies exist of which connection-less technologies have enjoyed a long term utilization and represent a large portion of the installed infrastructure. Connection-less technologies are prevalent in LAN environments and will therefore represent the focus of the present description without limiting the application of the described concepts thereto.

Connection-less data transport technologies regard data transport media as broadcast media via which the participating data network nodes exchange data packets. While broadcasting data is conducive to efficient data interchange within a LAN, in bridging geographically displaced LANs via carrier data networks, the broadcast-type data transport leads to data transport inefficiencies in the service provider's data transport network and perhaps to potential disclosure of closely-held information. The connection-less broadcast-type data transport in carrier networks does however benefit from redundant data transport, the broadcast-type data transport in effect routing data transport around failed data transport equipment by design.

Recent developments in the data communications field have brought about a Virtual LAN (VLAN) paradigm enabling the LAN to be extended into homes, remote office sites, geographically displaced government offices, etc. over existing installed infrastructure. VLAN technology enables logical grouping of data network nodes and related data transport infrastructure to extend LANs beyond the restrictions imposed by the underlying infrastructure. Data network nodes associated with the same VLAN behave as if participating in the same LAN, benefiting from the broadcast-type information exchange therebetween. As portions of the VLAN are typically provisioned over carrier networks, VLAN associated routing of data packets within carrier networks can be engineered to follow definite paths while still benefiting from redundant connectivity. The logical associativity defining the VLAN provides data traffic differentiation which enables encryption based protection of closely-held information. VLAN technologies enable routing of data packets based on the VLAN associativity thereof.

The logical grouping of data network nodes reduces the provisioning, the management, and the reconfiguration of data transport infrastructure for the customer by providing logical network design solutions with minimal changes to physical installed infrastructure. Data network nodes in each LAN segment of the VLAN are unaware as to whether they are connected to a single LAN segment or multiple bridged LAN segments.

A multitude of independent carriers cooperate in provisioning carrier WANs of the likes of the Internet. Although, in theory, data transport network infrastructure may be installed such that only one data transport path may exist between any two data network nodes; the amount of network configuration information that must be considered for such a data network design would be overwhelming and, as it was mentioned above, undesirable as a level of data transport redundancy is desirable for sustained data transport.

For a connection-less data transport network to function optimally, only one active data transport path should exist between any two data transport nodes. Multiple active paths between data network nodes cause loops in the associated network. If a loop exists in the network topology, the potential exists for duplication of data packets. When loops occur, a packet switching node deems at least one destination data network node to be reachable via multiple data ports associated with the data switching node. Under such conditions, forwarding algorithms employed at data switching nodes are designed to replicate data packets for transmission over the multiple data ports. It is desirable to limit such conditions to purposely configured instances thereof.

Developments in data packet routing include the adoption of a spanning-tree protocol and associated spanning-tree determination algorithms. The spanning-tree protocol is a link layer management protocol that prevents the establishment of undesirable data transport loops in data transport paths while providing support for data transport redundancy.

To provide path redundancy, the spanning-tree protocol defines a tree of in-use interconnecting data transport links that spans all data switching nodes in the associated data transport network. The spanning-tree protocol configures certain redundant data transport links into a stand-by state. If a data transport network segment previously under the influence of the spanning-tree protocol becomes unreachable, or if spanning-tree protocol configuration parameters change, the spanning-tree algorithm reconfigures the spanning-tree topology and re-establishes data transport to the unreachable data transport network segment by activating for use selected standby data transport links.

When the spanning-tree protocol is used in the carrier data transport network, the operation of the spanning-tree protocol is transparent to customer data network nodes and perhaps even to customer LANs. Dependent on a particular implementation of and the services supported over a carrier data transport network, multiple in-use spanning-trees may be defined and coexist. For example, a spanning-tree of in-use data transport links may be defined for high data throughput utilizing high bandwidth links, while another spanning-tree of in-use data transport links may be defined for low data transport latency utilizing the fewest number of data transport links.

BACKGROUND OF THE INVENTION

Connectivity determining spanning-tree algorithms may be run centrally via Network Management Systems (NMS) by analysts. To do so the analyst and the associated NMS must posses a large amount of information regarding data transport infrastructure in a realm of management of the NMS. Central spanning-tree determination benefits from an availability of the resulting spanning-tree for the analysts perusal in providing support for manual VLAN provisioning. Such solutions however tend to be reactive as data transport equipment failure instances require the analyst's attention at least in re-provisioning VLANs to re-establish VLAN connectivity over reconfigured spanning-trees.

In order to reduce network management and service provisioning overheads, the spanning-tree protocol may be implemented in a decentralized fashion with each data network node and data switching nodes running spanning-tree determination algorithms. A collective exchange of information therebetween provides the necessary information to determine and establish spanning-tree connectivity. While such a solution reduces the need for analyst intervention in re-establishing data transport connectivity subsequent to data transport infrastructure failures, the active in-use spanning-tree exists typically only as operational parameter configurations within individual data transport equipment and is unavailable to the analyst and the NMS for re-provisioning VLAN connectivity.

While co-pending commonly assigned Unites States Patent Application entitled "Virtual Local Area Network Auto-Discovery Methods" filed on even date, bearing attorney reference number 13597-US; describes methods of deriving VLAN configuration information from participating data network nodes, the described methods do not delve into VLAN provisioning. A considerable operational overhead is still incurred in manual VLAN provisioning.

Figure 1:
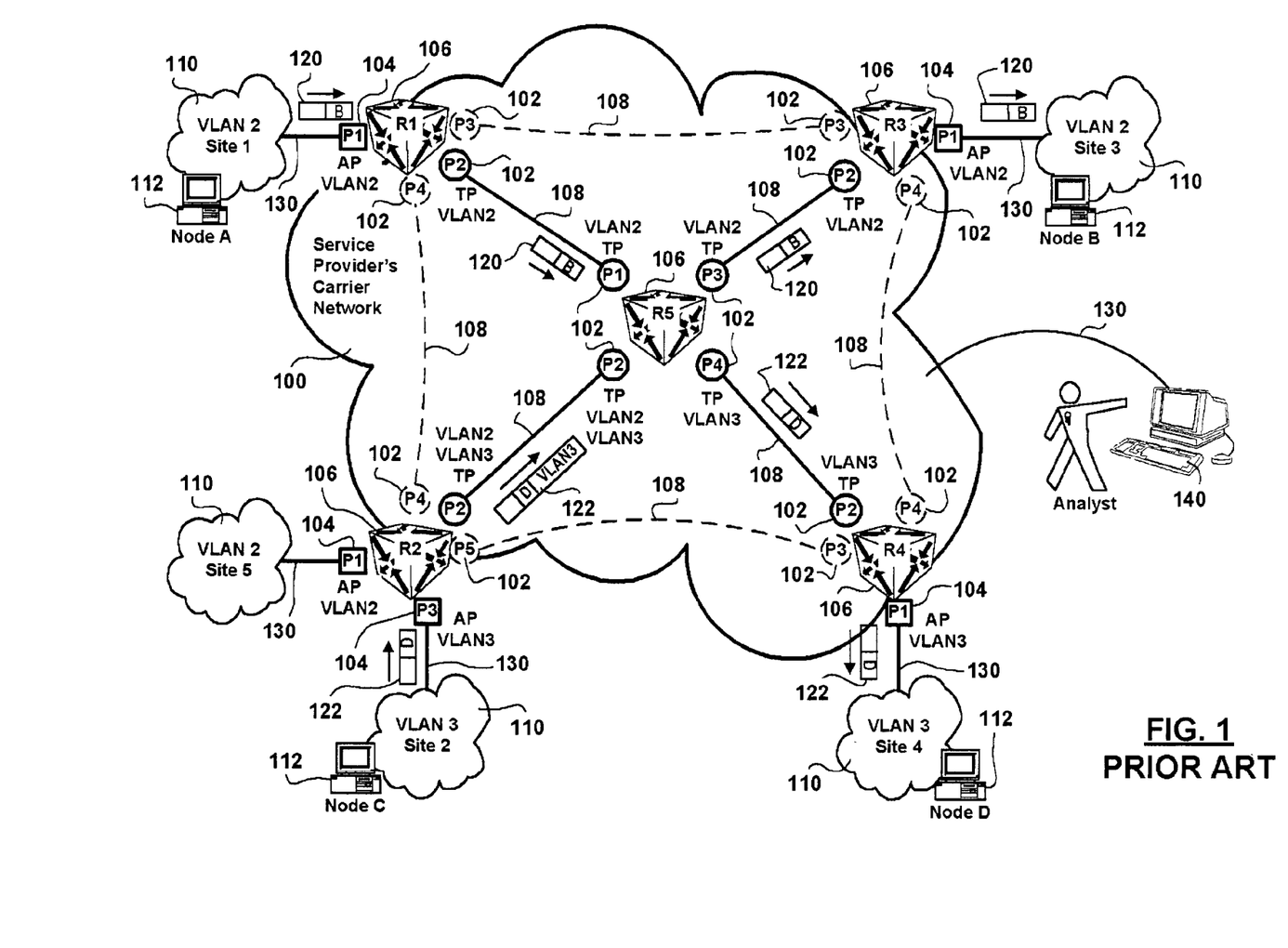
FIG. 1 is a schematic diagram showing configured interconnected data transport elements providing VLAN support in accordance with prior art VLAN provisioning solutions.

Referring to FIG. 1, prior art VLAN provisioning is performed manually by configuring individual data transport and switching equipment to provision trunk ports (TP) 102 and access ports (AP) 104 of manually selected data switching nodes 106 in a service provider (carrier) network 100. Such a prior art manual VLAN provisioning solution is provided by CISCO Systems' VLAN Director software version 2.1.

The access ports 104 are connected via access links 130 to the customer LANs 110 and the trunk ports 102 are connected to the data transport trunks 108 between the data switching nodes 106.

The use of the spanning-tree protocol avoids the creation of loops in the data transport network 100 by putting certain data transport trunks 108 in a stand-by state thereby preventing the replication of data packets 120/122 thereto as would otherwise result. Stand-by data transport trunks 108 are shown by dashing in the FIG. 1. In-use data transport trunks 108 are shown solid. A similar depiction is used with respect to the corresponding ports 102. Prior art VLAN provisioning methods typically call only for the trunk ports 102 and routers 106 associated with in-use data transport trunks 108 to be included in VLAN provisioning.

In accordance with the example shown in FIG. 1, the configuration of VLAN2 includes three customer LAN segments 110 at respective sites 1, 3, and 5; the LAN segments 110 are connected to respective routers 106-R1, 106-R3, and 106-R2 of a service provider's data transport network 100. Packets 120 of VLAN2 are routed over the shared service provider's carrier network 100 in accordance with the spanning-tree protocol, which has designated: router 106-R5 as a spanning-tree root node, data transport trunks 108-dashed on stand-by to prevent the formation of logical loops in the data transport network 100, and data transport trunks 108-solid in-use. For example, VLAN2 is provisioned only on ports 102-P1 and 102-P2 on each of routers 106-R1, 106-R2, and 106-R3 and on ports 102-P1, 102-P2, and 102-P3 on router 106-R5.

Data packets 120/122 are routed through the carrier data transport network 100 over the loop-free spanning-tree of data transport trunks 108-solid using Open Systems Interconnect (OSI) Layer-2, typically Media Access Control ADDResses (MAC ADDRs) conveyed in data packet 120 headers when the trunk ports 102 are provisioned (associated) with only one VLAN. In the case where a trunk port 102 is provisioned to support more than one VLAN, a VLAN identifier is added in the packet headers (122) in accordance with the IEEE 802.1Q protocol incorporated herein by reference. The VLAN identifier is used to route data packets 122 through the network 100 and the VLAN identifier is removed from packet headers when no longer needed. Ports 102-P2 of routers 106-R2 and 106-R5 are provisioned for both VLAN2 and VLAN3. VLAN data packets 122 thereby necessitate the use of the VLAN identifier to differentiate data traffic.

As routing examples, a packet 120 is shown to be routed from data network node 112-A to data network node 112-B using only the MAC address of node 112-B; another packet 122 is shown to be routed from node 112-C to node 112-D using the VLAN identifier for VLAN3 between routers 106-R2 and 106-R5, and using the MAC address for node 112-D over the rest of the data transport path.

In the event of a service-affecting fault, the spanning-tree protocol will recalculate the spanning-tree and re-assign data transport trunks 108 in-use.

The problem with the prior art solutions resented above lies in determining which data transport trunks 108 are chosen for use by the spanning-tree protocol. Such determination can be difficult and time-consuming, thereby making provisioning of VLANs likewise difficult and time-consuming. This is especially the case for large and complex data transport networks 100. The redefinition of the spanning-tree requires corresponding manual re-provisioning of the VLANs. Such manual provisioning is error prone.

Another development in the field which addresses VLAN provisioning methods is exemplified by CISCO's VLAN Trunk Protocol (VTP). The VLAN trunk protocol is a CISCO Systems proprietary solution to propagating manually configured VLAN information between adjacent VTP aware network elements. The propagation of VTP information is implemented as differentiated data traffic over VLAN 1 which means that VLAN support must be apriori activated for each VTP aware network element. To date only selected CISCO Catalyst products support the VTP protocol. The suitability for using the VTP protocol is dependent on: the definition of VTP domains of which other vendor equipment would be unaware, the establishment of VTP server/client relationships between VTP aware (CISCO only) network elements, memory for storage of VTP related information at each participating VTP aware network element, the ability to parse VTP specific frames, the ability to respond to a particular reserved broadcast address in exchanging VTP related information, etc. Although some benefit may be derived from the use of the VTP protocol over a CISCO only network equipment infrastructure, numerous shortcomings of the present definition of the VTP protocol call for the reduction of the extent of provisioned VLANs, which runs counter to the need to extent VLANs beyond the restrictions imposed by the physical network infrastructure. Various workarounds call for quick manual re-provisioning of VLAN support as the only reactive solution.

The demand for VLAN services has been and continues to be so great that the 12 bits allocated in accordance with the IEEE 802.1Q VLAN protocol is not enough. The IEEE 802.1Q VLAN protocol makes it possible for the provisioning of over 4000 VLANs with some VLAN identifiers being reserved for VLAN protocol functions and future feature development. The proliferation of VLAN services and the multitude of service providers has created situations in which VLAN service customers own part of the VLAN infrastructure, in most cases owning the necessary VLAN provisioning customer premise equipment. Although the co-pending commonly assigned United States Patent Application bearing attorney reference 13596-US entitled "Improved Virtual Local Area Network Provisioning in Bridged Networks", incorporated herein by reference, provides centralized methods of VLAN provisioning ensuring uniqueness of IEEE 802.1Q VLAN identifiers, VLAN customers in charge of their respective infrastructure perceive the VLAN identifier restrictions imposed by VLAN service providers restrictive, bothersome, and not portable. The portability of IEEE 802.1Q VLAN identifiers is important as VLAN customers change service providers as needs for data transport services change for reasons such as, but not limited to, needing additional capacity deliverable only over different physical layer technologies supported only by select service providers. There is a need to address issues of IEEE 802.1Q VLAN identifier portability to reduce possible customer-side data transport disruptions.

Inadvertent sharing of VLAN identifiers between customers in a provisioning scenario in which VLAN uniqueness is not centrally guaranteed becomes possible. Inadvertent sharing of VLAN identifier between customers leads to possible packet exchange between customers' private networks compromising data transfer security possibly leading to unwanted disclosure of closely held information. There is a need guard against this security risk in providing VLAN identifier portability.

Figure 2:
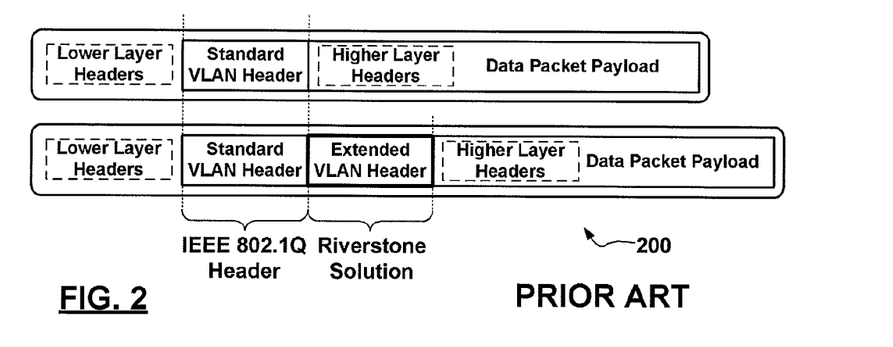
FIG. 2 is a schematic diagram showing exemplary packet structures as specified in the IEEE 802.1Q VLAN protocol and the Riverstone solution, respectively.

Developments in the field addressing the issue of VLAN identifier portability while ensuring data traffic differentiation include a proposed extension to the IEEE 802.1Q VLAN protocol by Riverstone Networks. The IEEE 802.1Q VLAN protocol extension proposes the use of an additional extension 802.1Q packet header to provide additional extended identifying bits. The use of the additional packet header provides for a hierarchical grouping of VLANs referred to VLAN stacking. FIG. 2 is a schematic diagram showing exemplary packet structures as specified in the IEEE 802.1Q VLAN protocol and the Riverstone solution, respectively; the Riverstone solution enables reuse of standard IEEE 802.1Q VLAN identifiers as long as the combined VLAN identification is unique.

The use of stackable VLAN technology complicates VLAN provisioning and VLAN management tasks due to the larger number of possible VLANs, while network management tools are limited to network element management specific tools such as Softelia™, provided by Riverstone Networks, akin to CISCO-type network element management solutions and therefore suffering from the same shortcomings mentioned above.

There is therefore a need to reduce operational overheads in provisioning VLAN support in data transport networks and lessen the reliance of provisioning on trained personnel.

SUMMARY OF THE INVENTION

In accordance with an aspect of the invention, a method of provisioning a backbone Virtual Local Area Network (VLAN) is provided. The steps include: obtaining at least one backbone VLAN Identifier, selecting a plurality of backbone VLAN trunks, and associating the backbone VLAN ID with each one of the plurality of backbone VLAN trunks. The selection and association of the backbone VLAN ID with each one of the plurality of backbone VLAN trunks is to be undertaken irrespective of an in-use and a stand-by designation of each one of the plurality of backbone VLAN trunks.

In accordance with another aspect of the invention, the method of provisioning a backbone VLAN further includes a step of: defining at least one switching rule by specifying a one of: a VLAN access port to VLAN access port binding; a VLAN access port to VLAN trunk port binding; a VLAN access port to stackable trunk port binding; a VLAN trunk port to VLAN trunk port binding; and a tunnel access port to stackable trunk port binding.

In accordance with a further aspect of the invention, a method of provisioning a backbone VLAN trunk is provided. The method includes steps of: obtaining a plurality of backbone VLAN IDs associated with a corresponding plurality of provisioned backbone VLANs, and associating the plurality of backbone VLAN IDs with the backbone VLAN trunk. The association of the plurality of backbone VLAN IDs with the backbone VLAN trunk is to be undertaken irrespective of a one of an in-use and a stand-by designation of the backbone VLAN trunk.

In accordance with a further aspect of the invention, a method of provisioning a stackable trunk port is provided. The method includes steps of: obtaining a plurality of backbone VLAN IDs associated with a corresponding plurality of provisioned backbone VLANs; and associating the plurality of backbone VLAN IDs with the stackable trunk port. The association of the plurality of backbone VLAN IDs with the stackable trunk port is to be undertaken irrespective of a one of an in-use and a stand-by designation of the stackable trunk port.

In accordance with a further aspect of the invention, a backbone VLAN provisioning human-machine interface is provided. A backbone VLAN ID selector is used for selecting a plurality of backbone VLAN IDs. A backbone VLAN trunk selector is used for selecting a plurality of backbone VLAN trunks. And, an activator is used for committing associations between the plurality of backbone VLAN IDs and the plurality of backbone VLAN trunks. The associations between the plurality of backbone VLAN IDs and the plurality of backbone VLAN trunks are to be made irrespective of one of an in-use and a stand-by designation of each one of the plurality of backbone VLAN trunks.

In accordance with a further aspect of the invention, the backbone VLAN provisioning human-machine interface is further operable to define at least one switching rule by specifying a one of: a VLAN access port to VLAN access port binding; a VLAN access port to VLAN trunk port binding; a VLAN access port to stackable trunk port binding; a VLAN trunk port to VLAN trunk port binding; and a tunnel access port to stackable trunk port binding.

In accordance with yet another aspect of the invention, a network management system for effecting backbone VLAN provisioning in a managed communications network is provided.

The exemplary solution described, provides enhanced VLAN provisioning which saves an operator's time, thereby reducing a service provider's operating costs. The described solution benefits from being implemented on a Network Management System (NMS) by provisioning VLAN support on all trunk links in an associated data transport network without requiring mundane manual selection of routers and trunk ports. Because the management is done through the human-machine interface on an NMS, the presented VLAN provisioning methods are much more efficient than legacy error prone manual command entry approaches performed via a network element management console on a per router/ per trunk port basis. The NMS has the advantages of being able to display/configure/modify the provisioned VLANs, and show any inconsistencies or misconfigurations thereof.

The solution provided increases the reliability, availability and serviceability of provisioned VLANs by pre-provisioning thereof on all trunk links including spanning-tree protocol stand-by designated trunk links. The stand-by data transport trunk links are ready for use, should the spanning-tree be redefined, thereby reducing the time required to bring the VLAN into service on the newly defined spanning-trees.

Data traffic security differentiation is important to VLAN customers. An increased level of security is provided as central VLAN provisioning ensures VLAN traffic differentiation. Ensuring that VLAN IDs are unique, both within a stackable VLAN and between stackable VLANs themselves, solves the problem of inadvertently sharing packets between customers.

BRIEF DESCRIPTION OF THE DRAWINGS

The features and advantages of the invention will become more apparent from the following detailed description of the preferred embodiments with reference to the attached diagrams wherein.

It will be noted that in the attached diagrams like features bear similar labels.

DETAILED DESCRIPTION OF THE EMBODIMENTS

Although the Riverstone stackable VLAN solution provides an extended VLAN identification, the solution does not enforce uniqueness of VLAN identifiers in support of VLAN traffic differentiation. Therefore the problem of inadvertent sharing of VLAN identifiers between VLAN customers remains unresolved.

In accordance with an exemplary embodiment of the invention, standard VLAN identifiers may be assigned by/to VLAN customers, while extended VLAN identifiers are managed by service providers. The separation enables centralized control of VLAN data traffic within carrier networks even though service providers do not enforce full control over standard VLAN identifier allocation. Additionally, the service providers have control over the associativity between VLAN customer standard VLAN identifiers and the extended VLAN identifiers. Typically and preferably the VLAN customers are not aware of the extended VLAN identifiers. For this reason the Riverstone solution brings about a backbone VLAN paradigm wherein: the extended VLAN identifiers are known as backbone VLAN identifiers defining corresponding backbone VLANs, trunk ports supporting the Riverstone solution are known as stackable trunk ports and the data transport trunk links associated therewith are known as backbone trunks. A new type of access port is also defined for switching VLAN data traffic onto backbone VLANs known as a tunnel access port. As opposed to standard VLAN access ports, tunnel access ports can be provisioned to convey data traffic associated with more than one standard VLAN. tunnel access ports are associated with VLAN trunks and the standard VLANs provisioned in connection therewith are unique within the group.

Needless to say, standard VLAN data traffic may be supported along with the backbone VLAN provisioning. Therefore VLAN provisioning equipment supporting IEEE 802.1Q VLANs and the Riverstone solution may not only coexist in the service provider's network, but often may be the same VLAN provisioning equipment. As such the physical data transport trunks may be the same while the VLAN data traffic is switched to logical VLAN access ports, logical VLAN trunk ports, logical tunnel access ports, and stackable trunk ports, respectively, based on standard and extended VLAN identifiers and switching rules. A central VLAN provisioning implementation enables careful selection of backbone VLAN identifiers and careful configuration of the switching rules to ensure VLAN traffic differentiation.

It is typical for core routers in the service provider's data transport network 100 to be enabled with the Riverstone solution. The definition of a core router is somewhat blurred as the data transport industry is undergoing a "box consolidation" trend wherein even the routers can be logical entities (such as virtual routers). The concepts will be described herein making reference to distinct access routers (106) and core routers (306) without limiting the invention thereto.

Figure 3:
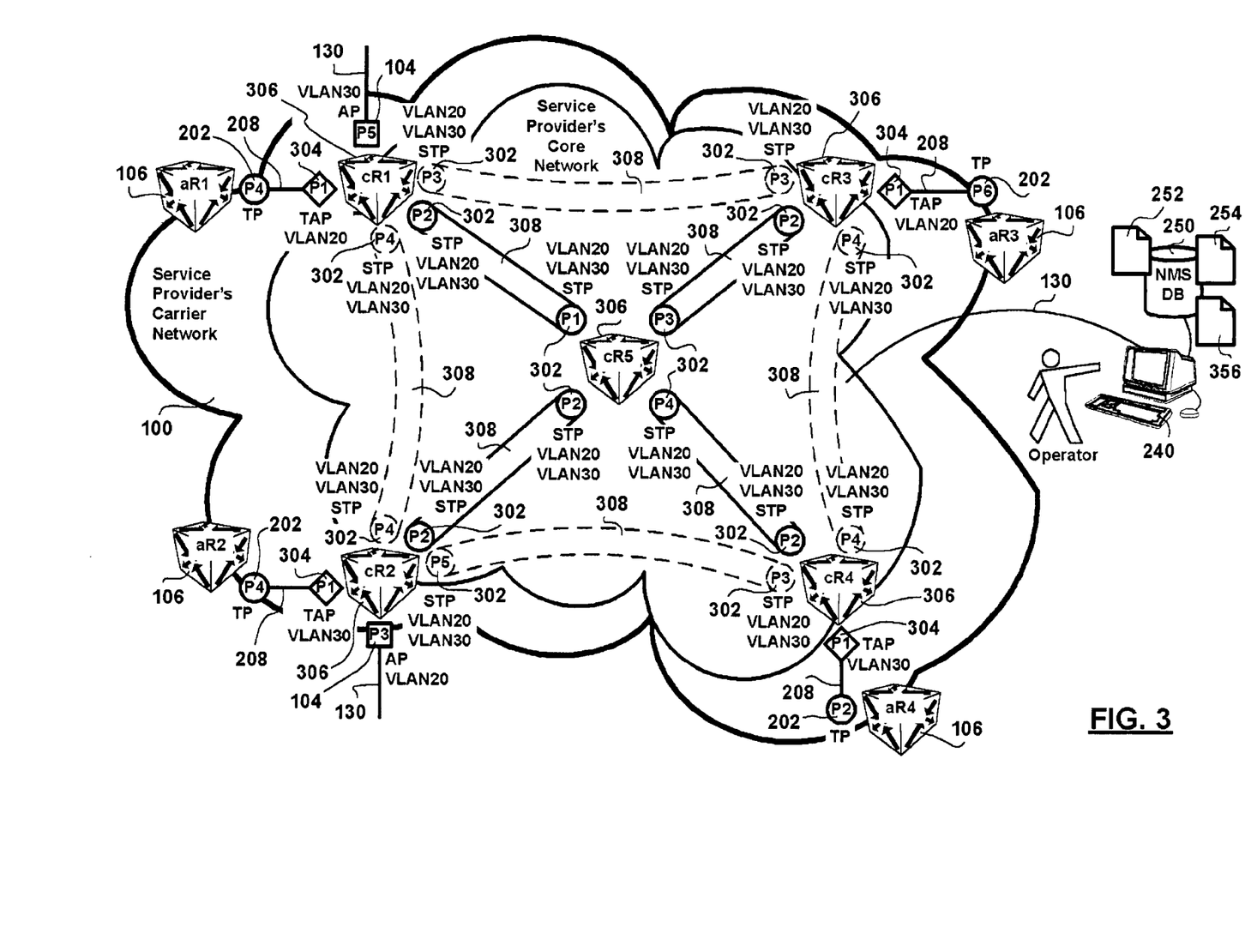
FIG. 3 is a schematic diagram showing, in accordance with an exemplary embodiment of the invention, configured interconnected data transport elements providing backbone VLAN support.

FIG. 3 is a schematic diagram showing configured interconnected data transport elements providing backbone VLAN support.

In accordance with an exemplary embodiment of the invention, each backbone VLAN is provisioned on all backbone trunk links 308 in the service provider's data transport network 100—including stand-by designated backbone trunk links 308-dashed. This technique provides for backbone VLAN pre-provisioning at improved operational efficiencies and eliminates the need to determine specific in-use backbone trunk links 308 and specific in-use stackable trunk ports 302 on specific (core) routers 306 participating in the active in-use spanning-tree topology.

The service provider's data transport network 100 typically carries data traffic associated with more than one backbone VLAN. Backbone VLAN identifiers must be included in VLAN packet headers (200) (see FIG. 2) to ensure VLAN data traffic differentiation. The packets 200 are routed through the core of the carrier's data transport network 100 using the backbone VLAN identifiers in accordance with the Riverstone solution.

As the spanning-tree protocol prevents the formation of logical data transport loops, backbone VLAN provisioning over stand-by designated backbone trunk links 308-dashed is not a concern. In fact, pre-provisioning backbone trunk links 308-dashed for all provisioned backbone VLANs has the advantage of making the backbone trunk links 308-dashed ready to carry VLAN traffic should the spanning-tree reconfigure. Details regarding VLAN data transport around failed VLAN equipment in the service provider's network 100 are omitted for brevity and provided in the above mentioned copending commonly assigned U.S. patent application attorney reference 13596-US which is incorporated herein by reference.

It is understood that standard VLAN provisioning, as presented in the above mentioned co-pending commonly assigned U.S. patent application attorney reference 13596-US, is performed independent and likely in parallel with the backbone VLAN provisioning presented herein. Core routers 306-cR1 and 306-cR2 are shown to also have associated wherewith VLAN access ports 104-P5 and 104-P3 respectively conveying VLAN data traffic in accordance with the IEEE 802.1Q VLAN protocol only. Although not shown, VLAN access ports 104 also specify standard VLAN identifiers corresponding to customer VLANs.

Figure 4:
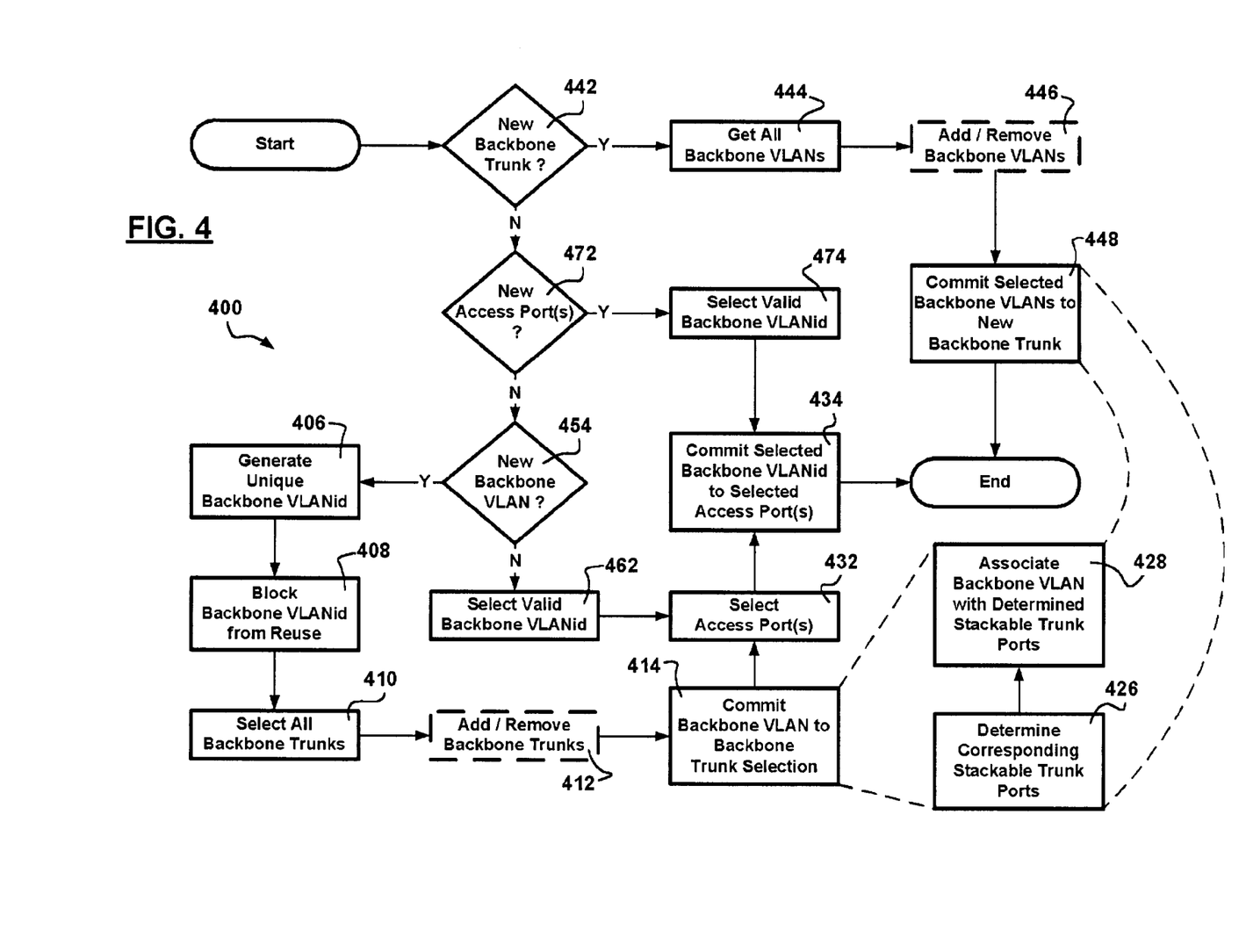
FIG. 4 is a schematic flow diagram showing backbone VLAN provisioning process steps used in accordance with the exemplary embodiment of the invention.

FIG. 4 is a flow diagram showing backbone VLAN provisioning process steps used in accordance with the exemplary embodiment of the invention.

The backbone VLAN provisioning process 400 enables an operator to: create unique backbone VLAN identifiers and define an associated backbone VLAN, configure new backbone trunk links 308 to participate in VLAN data transport, and configure new (tunnel) access ports 104/304. The above backbone VLAN provisioning functions may be performed independently. The presented VLAN provisioning process 400 further incorporates an exemplary progression of steps without limiting the invention thereto. The interlinking of selective customer sites will be presented herein below with reference to customer VLAN bindings.

In provisioning a new backbone VLAN, step 454, at least one unique backbone VLAN identifier is generated, step 406. In generating the unique backbone VLAN identifier the process 400 either chooses a next unused backbone VLAN identifier, or a previously surrendered and unused backbone VLAN identifier. The selected unique backbone VLAN identifier is subsequently blocked from reuse 408, typically by being stored in a (shared) roster 256 of in-use backbone VLAN identifiers stored centrally. In accordance with the Riverstone solution, 12 bits are used in extended packet headers to specify backbone VLAN identifiers. Selected backbone VLAN identifiers may be reserved for special functions. The reserved backbone VLAN identifiers may also be included in the roster 256 of in-use backbone VLAN identifiers to simplify backbone VLAN provisioning. The reserved backbone VLAN identifiers may not be surrendered for subsequent reuse. Backbone VLAN identifiers are shown schematically in the accompanying figures as VLAN ID 20, VLAN ID 30, etc., while standard VLAN ID as shown as VLAN ID 2, VLAN ID 3.

In accordance with the exemplary embodiment of the invention, in step 410 of the backbone VLAN provisioning process 400, all defined backbone trunk links 308 in the carrier's data transport network 100 are selected and associated 414 with the new backbone VLAN identifier. Note that the selection of all backbone trunk links 308 in the data transport network 100 is done regardless of the in-use/standby designation thereof resulting from the execution of spanning-tree algorithm(s).

The definition of backbone trunk links 308 represents a carrier network provisioning task described elsewhere. The definition of backbone trunk links 308 includes the specification of origination and stackable trunk ports 302. A network management database (NMS DB) 250 (see FIG. 3) holds backbone trunk link definitions. The association 414 of the backbone VLAN identifier with all trunk links 308 is typically implemented via backbone VLAN identifier associations with the corresponding stackable trunk ports 302. All of the corresponding stackable trunk ports 302 are determined, step 426, and the backbone VLAN identifier is associated (428) therewith. VLAN provisioning database records held by each (core) router 306 in the carrier's data transport network 100, show (see FIG. 3) the backbone VLAN identifiers associated with each stackable trunk port 302. This completes the definition of a new backbone VLAN in an efficient manner.

To complete backbone VLAN provisioning, provisions must be made for multiplexing/demultiplexing VLAN data traffic onto/from the defined backbone VLAN respectively. The central VLAN provisioning solution implemented, in multiplexing/demultiplexing VLAN data traffic onto/from a backbone VLAN, must ensure VLAN data traffic differentiation between VLAN customers.

The backbone VLAN provisioning process 400 shown in FIG. 4 enforces VLAN data traffic differentiation between VLAN customers by creating port-based switching rules. Port-based switching rules benefit from the fact that each tunnel access port 304 conveys VLAN traffic associated with a differentiated group of standard VLANs, whether all standard VLANs associated therewith are associated with a single VLAN customer or not. However, as each VLAN customer is allowed to chose standard VLAN identifiers, typically VLAN customers make use of VLAN ID starting with 2, 3, 4, 5, etc. because VLAN customer premise equipment has VLAN ID 2 as the next available choice as VLAN ID 1 is reserved for VLAN protocol functions. With typical use of a few standard VLANs per VLAN customer, port-based switching rules may quickly lead to a depletion of backbone VLANs—potentially one per VLAN customer—as all standard VLANs provisioned over one tunnel access port 302 have to be supported over the same backbone VLAN. Port-based switching rules may also include the specification of standard VLAN access ports 104 which provides an increased control granularity in implementing VLAN data traffic differentiation. Access ports 104/304 are selected 432 and the new backbone VLAN identifier is associated 434 therewith.

While operating a data transport network 100, typically new backbone trunk links 308 may be added via provisioning processes described elsewhere. In accordance with the exemplary embodiment of the invention, if a new backbone trunk link 308 is added 442, all backbone VLANs provisioned in the service provider's data transport network 100 should be associated with the new backbone trunk link 308. Therefore, the VLAN provisioning process 400 selects all provisioned backbone VLANs in step 444 and (subject to add/removals 446) associates 448 all (selected) provisioned backbone VLANs to the new backbone trunk link 308. In implementing step 448, the provisioning process 400 performs steps 426 and 428 as described herein above.

Provisioned backbone VLAN support, may be modified by modifying the group of (tunnel) access ports 304/104 associated with provisioned backbone VLANs. In modifying the group of (tunnel) access ports 304/104 associated with the provisioned backbone VLANs, a valid backbone VLAN identifier is selected 462 and the backbone VLAN provisioning process 400 resumes from step 432.

While operating a data transport network 100, typically new (tunnel) access ports 304/104 are brought into service. To provision VLAN services over the newly added (tunnel) access ports 304/104, at least one backbone VLAN identifier is selected 474 and the backbone VLAN provisioning process 400 resumes from step 434.

It is understood that the methods of backbone VLAN provisioning described herein are not limited to backbone VLAN provisioning on backbone trunk links 308 and have been presented as such to simplify the presentation of the relevant concepts. In fact each (core) router 306 is unaware of backbone trunk links 308 and only aware of corresponding stackable trunk ports 302. Moreover, in provisioning a backbone VLAN on a backbone trunk link 308, corresponding stackable trunk ports 302 on separate (core) routers 306, at each end of the backbone trunk link 308, must be configured. Restated another way, in accordance with the invention, each backbone VLAN is provisioned on all stackable trunk ports 302 in the data transport network 100. This is what actually takes place as described with reference to backbone VLAN provisioning steps 426 and 428. In the interest of reducing operational overheads this level of detail is purposely abstracted in providing the exemplary backbone VLAN provisioning solution. The NMS database 250 maintains associations between data transport equipment entities in the data transport network 100 defining corresponding backbone trunk links 308.

The backbone VLAN provisioning process 400 is a service provider performed service which ensures the uniqueness of the backbone VLAN identifiers used in the carrier's data transport network 100. The VLAN provisioning process reduces backbone VLAN provisioning overheads.

Inevitably edge managed data network elements at the edge of a managed data transport network 100 are used to provide connectivity with adjacent data transport networks managed by peer service providers. Therefore backbone VLAN trunks 308 bridging two managed domains exist. For such backbone VLAN trunks, the backbone VLAN provisioning methods apply at least to the proximal managed corresponding stackable trunk ports 302.

When implemented on a Network Management System (NMS) 240, see FIG. 3, the VLAN provisioning process 400 may be operable via a graphical user interface having widgets such as selection boxes, buttons, specifier fields, etc.

Figure 5:
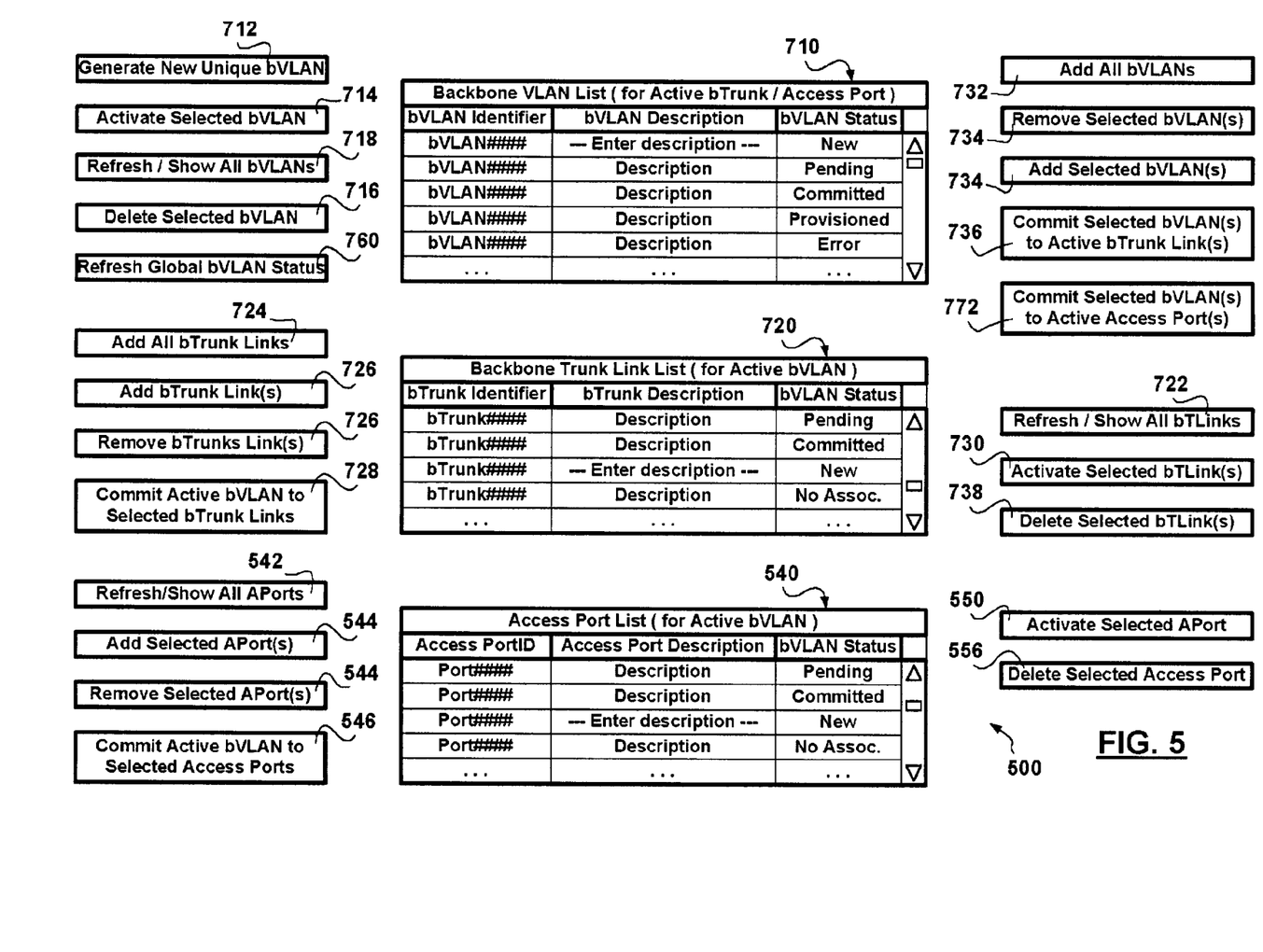
FIG. 5 is a schematic diagram showing, in accordance with the exemplary embodiment of the invention, generic elements of a human-machine interface used in backbone VLAN provisioning.

FIG. 5 is a schematic diagram showing, in accordance with the exemplary embodiment of the invention, generic interactive elements of a human-machine interface used in backbone VLAN provisioning. It is understood that combinations of the presented elements may be used to generate a multitude of graphical user interface panels for a more intuitive and/or more standardized human-machine interface. It is further understood that the exemplary human-machine interface 500 presented herein may be further simplified by overloading the function of the various interactive elements to perform context aware actions in accordance with implementation paradigms used.

A "Generate New Unique Backbone VLAN" identifier button 712 is provided for implementing functionality of steps 454 and 406 of the backbone VLAN provisioning process.

In generating 406 a new unique backbone VLAN identifier a backbone VLAN list 710 will have one entry specifying: a new unique backbone VLAN identifier, a prompt to enter a description, and a backbone VLAN provisioning status—"New" in this case.

An "Activate Selected Backbone VLAN" button 714 and a "Delete Selected Backbone VLAN" button 716 may also be provided. In pressing the Delete Selected Backbone VLAN button 716, all corresponding backbone VLAN identifier associations to backbone trunk links 308 and (tunnel) access ports (304) 104 are removed. The corresponding backbone VLAN status will display "Pending" while the associations are removed. Subsequent to the removal of backbone VLAN associations, the corresponding backbone VLAN identifier is released and made available for subsequent re-use.

Typically network management and service provisioning can and is performed in parallel via a multitude of NMS' 240. Therefore, so can backbone VLAN provisioning be performed in parallel. In accordance with such an implementation, the backbone VLAN identifier roster 256 are shared between all participating NMS' 240. A "Refresh/Show All Backbone VLANs" button 518 is provided to refresh the Backbone VLAN list 710, perhaps also refreshing the backbone VLAN provisioning status for all backbone VLANs. Pressing the Refresh/Show All Backbone VLANs button 718 may have a context sensitive response. The usefulness of the later capability will further become more apparent from the description herein below making reference to provisioning new backbone trunk links 208 and to provisioning of new (tunnel) access ports (304) 104.

Activating a selected backbone VLAN, the NMS 240 presents the operator with a list 720 of all of the backbone trunk links 308 on which the backbone VLAN is provisioned. In the case of a newly created backbone VLAN, the list of backbone trunk links 720 would be empty.

As mentioned above, backbone trunk links 308 are provisioned via processes described elsewhere and may happen in parallel with backbone VLAN provisioning. A "Refresh/Show all Backbone Trunk Links" button 722 is provided to display all provisioned backbone trunk links 308 in the data transport network 100. Since backbone trunk links 308 may be associated with more than one backbone VLAN, the backbone VLAN provisioning status displayed in the backbone trunk link list 720 may only have meaning in the context of a then currently active backbone VLAN. An exemption is a newly provisioned backbone trunk link 308 which does not yet have backbone VLAN associations and whose backbone VLAN provisioning status is "New".

In accordance with the exemplary embodiment of the invention, a single click of an "Add All Backbone Trunk Links" button 724 is sufficient to initiate backbone VLAN provisioning on all backbone trunk links 308 in the service provider's data transport network 100 in performing step 410 of the backbone VLAN provisioning process. The functionality of backbone VLAN provisioning step 410, enables novice operators with little VLAN technology experience to efficiently and effortlessly perform backbone VLAN provisioning.

As an advanced feature associated with the backbone trunk link selection step 410 an analyst may also be provided with the opportunity to tailor the backbone trunk selection by adding and removing 412 selected backbone trunk links 208 via corresponding "Add/Remove Selected Backbone Trunk Link(s)" buttons 726. Specifying backbone trunk links 308 to be excluded from a backbone VLAN provisioning still saves time for the analyst compared to the prior art methods of specify the trunk ports 302 to be included, as there typically are fewer backbone trunk links 308 to excluded than to include. The fewer number of backbone trunk links 308 to be excluded stems from the preferred provisioning of backbone VLANs over all backbone trunk links 308.

Backbone VLAN provisioning on backbone trunk links 308 is completed by pressing a "Commit Active Backbone VLAN to Selected Backbone Trunk Links" button 728 which implements functionality of the backbone VLAN provisioning step 414. The corresponding backbone VLAN provisioning status of the selected backbone trunk links 308 will initially show "Pending" as steps 426 and 428 of the backbone VLAN provisioning process 400 are performed. Subsequent to performing steps 426/428 the backbone VLAN provisioning status changes to "Committed". The sequence of interaction provides for easy and efficient backbone VLAN provisioning in the service provider network 100.

As mentioned above, besides attending to backbone VLAN provisioning tasks, network management and service provisioning also includes backbone trunk link 308 provisioning. In accordance with the exemplary embodiment of the invention, every backbone trunk link 308 is to be configured to support data transport for all provisioned backbone VLANs. Therefore all provisioned backbone VLANs should also be provisioned over new backbone trunk links 308.

As backbone trunk link provisioning is done in parallel, by pressing the Refresh/Show All Backbone Trunk Links button 722, all provisioned backbone trunk links 308 in the data transport network 100 are displayed irrespective of backbone VLAN associativity. All newly provisioned backbone trunk links 308 are also shown in the backbone trunk link list 720. The operator may select the newly provisioned backbone trunk links 308 and operate an "Activate Selected Backbone Trunk Link(s)" button 730 to create an interaction context in which subsequent actions may be performed on the selected backbone trunk links.

A clash of adjectives is noted. It is pointed out that the activation of selected backbone trunk links performed via pressing the button 730 refers to creating an interaction context in which subsequent human-machine interactions may be performed thereon; and not, to make the selected backbone trunk links 308 part of the active in-use data transport topology. Only the spanning-tree protocol affects the inclusion of backbone trunk links 308 in the active in-use data transport topology.

With the selected newly provisioned backbone trunk links 308 activated for interaction therewith, the backbone VLAN list 710 shows the backbone VLANs associated therewith—in this case none will be displayed as the active backbone trunk link 308 is newly provisioned. By operating the Refresh/Show All Backbone VLANs button 718 (without an active interaction context) all provisioned backbone VLANs are shown in the backbone VLAN list 710.

In accordance with the exemplary embodiment of the invention, a single click of an "Add All Backbone VLANs" button 732 is sufficient to initiate backbone VLAN provisioning of all provisioned backbone VLANs in the service provider's data transport network 100 on the selected (active) newly provisioned backbone trunk links 308, implementing functionality of backbone VLAN provisioning step 444. The functionality of backbone VLAN provisioning step 444, enables novice operators with little VLAN technology experience to efficiently perform backbone VLAN provisioning.

As an advanced feature associated with the backbone VLAN selection step 444 an analyst may also be provided with the opportunity to tailor the backbone VLAN selection by adding and removing 446 selected backbone VLANs via corresponding "Add/Remove Selected Backbone VLAN(s)" buttons 734. Specifying backbone VLANs to be excluded from backbone VLAN provisioning still saves time for the analyst as there typically are fewer backbone VLANs to excluded than to include. The fewer number of backbone VLANs to be excluded stems from the preferred backbone VLAN provisioning over all backbone trunk links 308.

Backbone VLAN provisioning on the newly provisioned backbone trunk links 308 is completed by pressing a "Commit Selected Backbone VLAN(s) to Active Backbone Trunk Link(s)" button 736 which implements functionality of backbone VLAN provisioning step 448. The corresponding backbone VLAN provisioning status of the selected backbone trunk links 308 will initially show "Pending" as steps 426 and 428 of the backbone VLAN provisioning process 400 are performed. Subsequent to performing steps 426/428 the backbone VLAN provisioning status changes to "Committed". The sequence of interaction provides for easy and efficient backbone VLAN provisioning in the service provider network 100.

In accordance with another implementation of the invention, the provisioning of all backbone VLANs over newly provisioned backbone trunk links 308 is an automatic network management and service provisioning function performed without necessitating operator/analyst interaction.

As new backbone trunk links 308 may be provisioned, backbone trunk links 308 may also be decommissioned. A "Delete Selected Backbone Trunk Link(s)" button 738 may be provided. In decommissioning a selected backbone trunk link 308, all backbone VLAN associations with the selected backbone trunk link 308 are removed only. The corresponding backbone VLAN provisioning status may show that the selected backbone trunk links 308 are being decommissioned by specifying that no backbone VLAN associations exist therewith. As backbone trunk links 308 may be decommissioned via other network management and service provisioning processes, it is understood that the sequence of operation just described may be performed automatically without necessitating operator/analyst attention.

It is understood that provisioning new, and decommissioning backbone trunk links 308 triggers the spanning-tree algorithms to re-calculate the spanning-tree(s).

An access port list 540 shows (tunnel) access ports 304/104 associated with the active backbone VLAN. For a newly created backbone VLAN, the access port list 540 would be empty.

By operating a "Refresh/Show All Access Ports" button 542 all (tunnel) access ports 304/104 in the data transport network 100 are displayed in the access port list 540. The status of each access port may only have a meaning with respect to the active backbone VLAN. Other implementations of the access port VLAN status may be used without limiting the invention to the description presented herein.

Using "Add/Remove Selected Access Port(s)" buttons 544 is sufficient to initiate backbone VLAN provisioning of the active backbone VLAN on the selected (tunnel) access ports 304/104. Backbone VLAN provisioning on the selected (tunnel) access ports 304/104 is completed by pressing a "Commit Active Backbone VLAN(s) to Selected Access Port(s)" button 546 which implements functionality of the backbone VLAN provisioning step 434. The corresponding backbone VLAN provisioning status of the selected (tunnel) access ports 304/104 will initially show "Pending" as commands are issued to the affected (tunnel) access ports 304/104. Subsequently the backbone VLAN provisioning status changes to "Committed". The presented sequence of interaction provides for easy and efficient backbone VLAN provisioning in the service provider network 100.

Just as new backbone trunk links 208 can be provisioned in parallel with backbone VLAN provisioning, so can access port provisioning (472). Therefore by operating the Refresh/Show All Access Ports button 542 without a context (no active backbone VLAN), all provisioned (tunnel) access ports 304/104 are displayed in the access port list 540. Newly provisioned (tunnel) access ports 304/104 bear a "New" backbone VLAN provisioning status.

By selecting (472) at least one (tunnel) access port 304/104 from the access port list 540 and operating an "Activate Selected Access Port(s)" button 550, the backbone VLAN list 710 displays backbone VLANs associated with the active (tunnel) access port selection. For a newly provisioned (tunnel) access port 304/104 the backbone VLAN list 710 will be empty.

By operating the Refresh/Show All Backbone VLANs button 718, the backbone VLAN list 710 displays all customer backbone VLANs and by operating the Add/Remove Selected Backbone VLAN(s) buttons 734 is sufficient to initiate backbone VLAN provisioning of the backbone VLAN (s) on the selected (tunnel) access ports 304/104 implementing functionality of the backbone VLAN provisioning step 474. Backbone VLAN provisioning on the selected (tunnel) access ports 304/104 is completed by pressing a "Commit Selected Backbone VLAN(s) to Active Access Port(s)" button 552 which implements functionality of backbone VLAN provisioning step 434. The corresponding backbone VLAN provisioning status of the selected backbone VLANs will initially show "Pending" as commands are issued to the affected (tunnel) access ports 304/104. Subsequently the backbone VLAN provisioning status changes to "Committed". The presented sequence of interaction provides for easy and efficient backbone VLAN provisioning in the service provider network 100.

As new (tunnel) access ports 304/104 may be provisioned, existing (tunnel) access ports 304/104 may also be decommissioned. A "Delete Selected Access Port(s)" button 556 may be provided. In decommissioning a selected (tunnel) access port 304/104, all backbone VLAN associations with the selected (tunnel) access port 304/104 are removed only. The corresponding backbone VLAN provisioning status may show that the selected (tunnel) access ports 304/104 are being decommissioned by specifying that no backbone VLAN associations exit therewith. As (tunnel) access ports 304/104 may be decommissioned via other network management and service provisioning processes, it is understood that the sequence of operation just described may be performed automatically without necessitating operator/analyst attention.

Additional interactive elements may be provided for extracting to an electronic form and/or perhaps obtaining hard copies of the backbone VLAN 710, Backbone Trunk 520, and (Tunnel) Access Port 540 lists enabling VLAN inventory reporting functionality.

Attention is drawn to the backbone VLAN description specifier associated with each backbone VLAN list entry (710). Backbone VLAN names are used in identifying thereof. Typically this specifier is populated with a mnemonic including, but not limited to, Customer Identifier. The backbone VLAN description specifier may not have a particular format, a requirement exists for the backbone VLAN description to be unique. Using the Customer ID alone for a VLAN customer owning a group of VLANs may not sufficient to provide data traffic differentiation.

In interacting with the "Commit . . ." buttons 546, 728, 736, 772, etc., the VLAN provisioning further includes propagating the backbone VLAN description specifier to the various provisioning database records held by field installed VLAN equipment. This includes the association of the backbone VLAN description specification with the stackable trunk ports 302, (tunnel) access ports 304/104, backbone trunk link 308 definitions, etc. The propagation of the backbone VLAN description into the network 100, on performing backbone VLAN provisioning, enhances maintainability of the provisioned VLAN services. The consistency in the propagation of backbone VLAN description specifiers into the network 100 helps ensure data traffic differentiation between provisioned customer VLANs.

A further "Refresh Backbone Global VLAN Status" button 760 may be provided. Operating the Refresh Backbone Global VLAN Status button 760, displays all provisioned backbone VLANs in the backbone VLAN list 710 with the current backbone VLAN status. In the event in which a particular backbone VLAN provisioning discrepancies have occurred, the backbone VLAN status displayed is "Error" otherwise the backbone VLAN status is "Provisioned". This provides (visual) feedback in ensuring that backbone VLAN provisioning has been successfully completed across the data transport network 100. An aggregation of all (tunnel) access port 304/104 operational statuses may also be included in the backbone VLAN provisioning status.

For certainty, in accordance with the exemplary embodiment of the invention, backbone VLANs are provisioned over all physical infrastructure providing stackable VLAN support. Standard VLAN identifiers associated with each backbone VLAN are distinct and unique therebetween. Therefore, to two same standard VLAN identifiers each associated with a different backbone VLAN can be associated with the same customer site 110 and in particular with the same VLAN access port 104.

Dependent on the particular implementation, a wide variety of backbone VLAN provisioning status states my be defined, probed for and detected. For example, it is possible for the "Pending" backbone VLAN provisioning status to persist for some time or a provisioning error to occur. These instances may be the result of race conditions which have led to VLAN configuration conflicts and/or the result of a temporary unavailability of a subset of the VLAN equipment on which the backbone VLAN provisioning is to have to effected. Subsequent activation of the "Commit . . ." buttons 546, 728, 736, 772 etc. may alleviate such and other anomalous instances. Nevertheless, the feedback provided via the backbone VLAN provisioning status reporting functionality provided greatly reduce backbone VLAN provisioning overheads by enabling an analyst to quickly identify, interpret, and address (backbone) VLAN provisioning failures.

Further details regarding backbone VLAN provisioning steps 426 and 428 are described, without limiting the invention thereto, in: co-pending commonly assigned U.S. patent applications Ser. No. 10/021,080, filed on Dec. 19, 2001, entitled "NETWORK MANAGEMENT SYSTEM ARCHITECTURE"; co-pending commonly assigned U.S. patent application Ser. No. 10/021,629, filed on Dec. 19, 2001, entitled "METHOD OF INVOKING POLYMORPHIC OPERATIONS IN A STATICALLY TYPED LANGUAGE"; and co-pending commonly assigned U.S. patent application Ser. No. 10/115,900, filed on Apr. 5, 2002, entitled "COMMAND LINE INTERFACE PROCESSOR" all of which are incorporated herein by reference. In summary, implementing the backbone VLAN identifier associations pertaining provisioned backbone VLANs includes issuing commands to network elements associated with the stackable trunk ports 302 corresponding to the backbone trunks 308 and (tunnel) access ports 304/104. In using Command Line Interface (CLI) commands, all aspects of backbone VLAN provisioning may be addressed.

Varying VLAN service offerings blur the requirement for inclusion of VLAN access port 104 and/or tunnel access port 304 configuration into VLAN provisioning. VLAN service offerings exist in which customer premise equipment providing VLAN support are provided by the VLAN service provider. Therefore the VLAN service provider may at least manage the uplink/backbone side of the customer premise equipment providing the VLAN support. In accordance with such a service offering, a VLAN trunk 208 exists between the service provider's carrier network 100 and the customer premise equipment with both VLAN trunk ports 202 associated therewith falling in the service provider's management domain. VLAN access port configuration on the private side of the provided customer premise equipment falls under the customer's realm of management.

Figure 6:
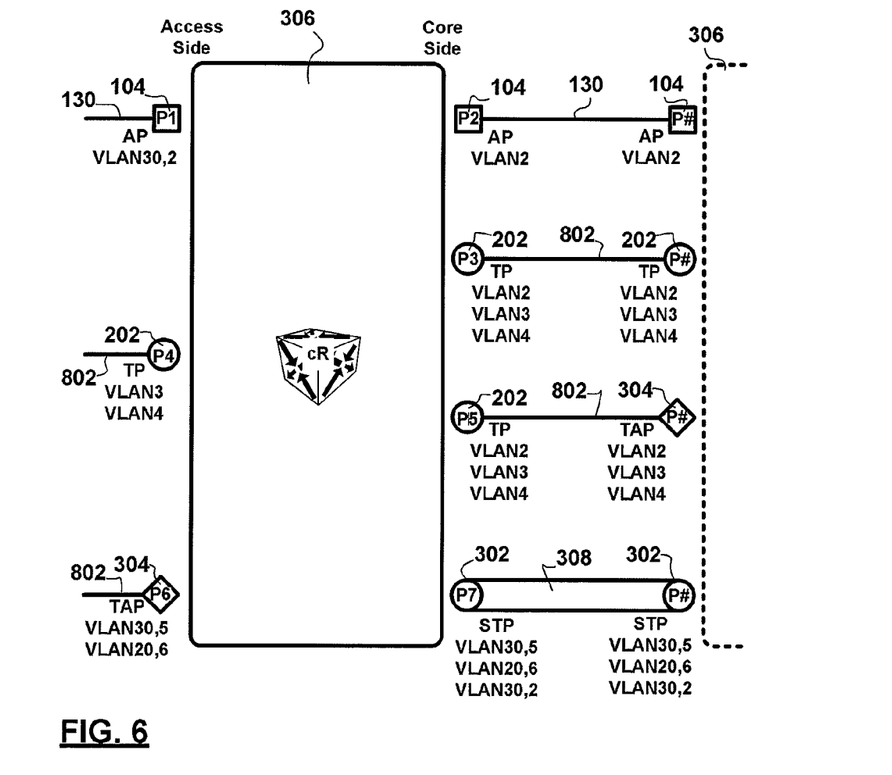
FIG. 6 is a schematic diagram showing a VLAN identifier associativity hierarchy in provisioning VLAN services, in accordance with another exemplary embodiment of the invention.

FIG. 6 is a schematic diagram showing a VLAN identifier associativity hierarchy in provisioning VLAN services.

In accordance with another implementation of the invention, besides the tunnel access port 304 associations with a backbone VLAN, individual standard VLANs can be multiplexed/demultiplexed onto/from a backbone VLAN. The switching rules therefore are defined between standard VLAN identifiers and extended backbone VLAN identifiers.

The following switching rules may be defined between:
- a VLAN access port 104 on the access side with another VLAN access port 104 on the backbone side enabling data traffic associated with a single standard VLAN identifier to be switched therebetween;
- a VLAN access port 104 on the access side with a VLAN trunk port 202 on the backbone side enabling data traffic associated with a single standard VLAN identifier to be switched onto a VLAN trunk 208;
- a VLAN access port 104 on the access side with another stackable trunk port 302 on the backbone side enabling data traffic associated with a single standard VLAN identifier to be switched onto a backbone trunk 308
- a VLAN trunk port 202 on the access side with another VLAN trunk port 202 on the backbone side enabling data traffic associated with multiple standard VLAN identifiers to be switched therebetween; and
- a tunnel access port 304 on the access side with a stackable trunk port 302 on the backbone side enabling data traffic associated with multiple standard VLAN identifiers to be switched onto a backbone trunk 308.

All of the above switching rules are specified in the upload direction switching rules for the download directions may be defined mutatis mutandis.

Also shown are data transport link definitions:
- a data transport link 130 conveying data traffic associated with a single VLAN identifier having VLAN access ports 104 at each end;
- a VLAN trunk link 208 conveying data traffic associated with multiple VLAN identifiers having trunk access ports 202 at each end;
- a VLAN trunk link 208 conveying data traffic associated with multiple VLAN identifiers having a trunk access port 202 at an end, and a tunnel access port 302 at the other end; and
- a backbone trunk link 308 conveying data traffic associated with multiple backbone VLAN identifiers having stackable access ports 202 at each end.

Figure 7:
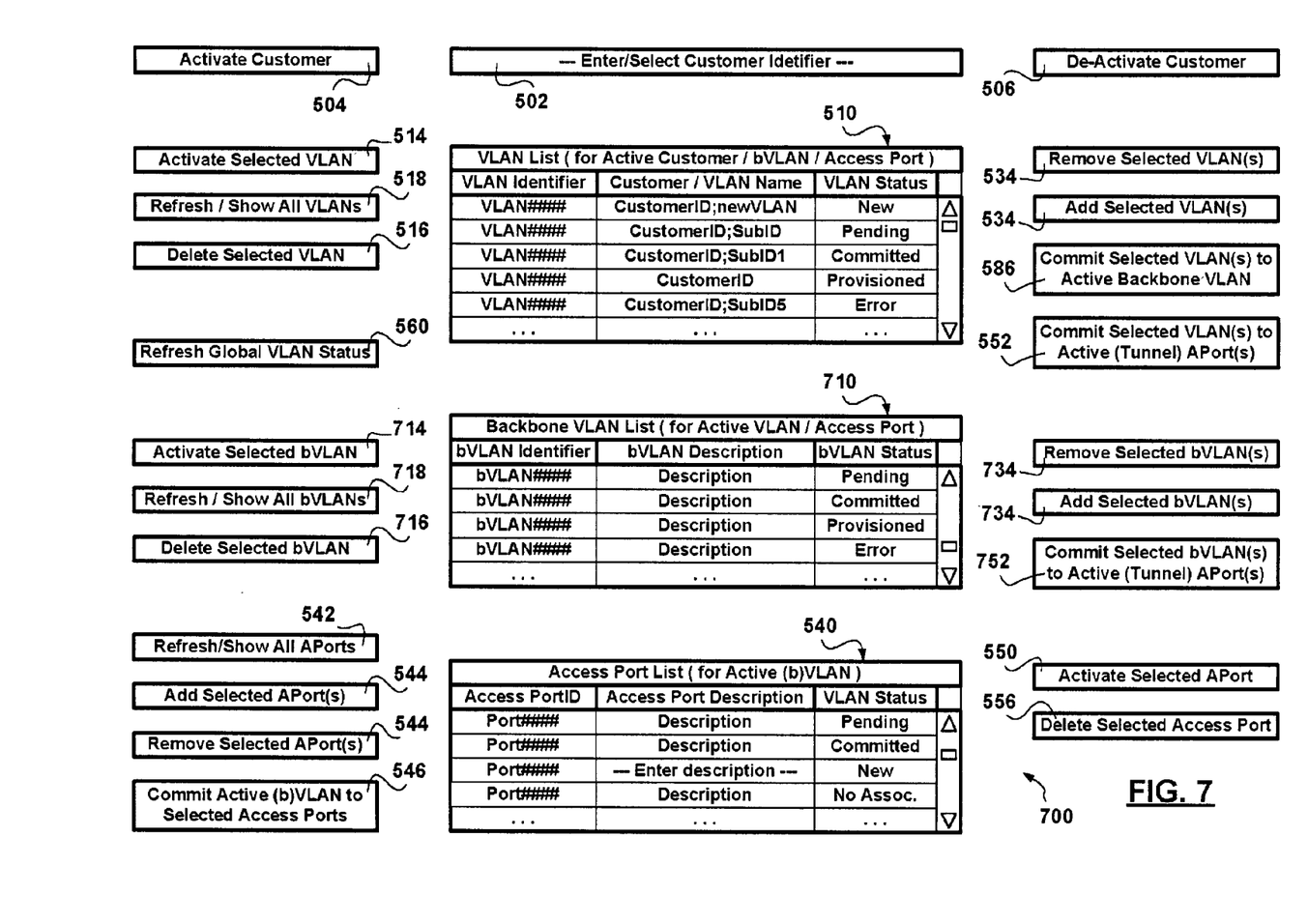
FIG. 7 is a schematic diagram showing, in accordance with another exemplary embodiment of the invention, generic elements of a human-machine interface used in ensuring data traffic differentiation via stackable VLAN identifiers.

FIG. 7 is a schematic diagram showing, in accordance with the exemplary embodiment of the invention, generic elements of a human-machine interface used in ensuring data traffic differentiation via stackable VLAN identifiers.

The human-machine interface 700, provides for customer binding creation. New VLAN customer profile creation and new standard VLAN generation are presented in the above mentioned co-pending commonly assigned U.S. patent application attorney reference 12596-US and omitted here for brevity.

In short, the steps performed by an analyst in effecting VLAN provisioning, the various human-machine interface elements are operable to:
- create a VLAN customer context in which standard VLANs are associated therewith;
- create a VLAN access port context in which a standard VLAN is associated therewith;
- create a backbone VLAN context in which a one of an individual standard VLAN and a VLAN access port each associated with a standard VLAN, is associated therewith if, the associated standard VLAN identifier, regardless of VLAN customer association, is not already associated with the backbone VLAN specified by the backbone VLAN context; and
- create a backbone VLAN context in which a tunnel access port is associated with a single backbone VLAN if, each one of a group of standard VLAN identifiers associated with the tunnel access port, regardless of VLAN customer associativity, is not already provisioned over the backbone VLAN specified by the backbone context.

The body of actual associations forms the basis for the switching rules mentioned above. Note that the VLAN provisioning techniques are performed centrally via the NMS 240 while the resulting switching rules are associated with routers in the service provider's network 100.

Therefore, multiple standard VLANs, multiple VLAN access ports 104, and multiple tunnel access ports 304 may be associated with a single backbone VLAN provided that all standard VLANs provisioned over the single backbone VLAN trunk are unique—that is: associations between IEEE 802.1Q VLAN identifiers and extended Riverstone proposed VLAN identifiers are unique—therefore ensuring data traffic differentiation across the carrier network 100.

The embodiments presented are exemplary only and persons skilled in the art would appreciate that variations to the above described embodiments may be made without departing from the spirit of the invention. The scope of the invention is solely defined by the appended claims.

We claim:

1. A method of provisioning a backbone Virtual Local Area Network (VLAN) comprising:
   a. obtaining at least one backbone VLAN Identifier (ID);
   b. selecting a plurality of backbone VLAN trunks; and
   c. associating each of the backbone VLAN ID with each one of the plurality of backbone VLAN trunks by:
      c1. determining a plurality of stackable trunk ports corresponding to the plurality of backbone VLAN trunks; and
      c2. associating the backbone VLAN ID with each one of the plurality of stackable trunk ports;
   wherein the selection and association of the at least one backbone VLAN ID with each one of the corresponding plurality of backbone VLAN trunks is undertaken irrespective of one of an in-use and a stand-by designation of each one of the plurality of backbone VLAN trunks and each one of the plurality of stackable trunk ports.

2. A method of provisioning a backbone VLAN as claimed in claim 1, the method further comprising tracking previously obtained backbone VLAN IDs.

3. A method of provisioning a backbone VLAN as claimed in claim 1, the method further comprising generating the at least one backbone VLAN ID.

4. A method of provisioning a backbone VLAN as claimed in claim 3, wherein generating the at least one backbone VLAN ID comprises generating a unique backbone VLAN ID.

5. A method of provisioning a backbone VLAN as claimed in claim 1, wherein selecting the plurality of backbone VLAN trunks comprises selecting all managed backbone VLAN trunks.

6. A method of provisioning a backbone VLAN as claimed in claim 5, wherein selecting all managed backbone VLAN trunks comprises selecting all managed backbone VLAN trunks in an associated realm of management.

7. A method of provisioning a backbone VLAN as claimed in claim 5 further comprising de-selecting at least one backbone VLAN trunk.

8. A method of provisioning a backbone VLAN as claimed in claim 1, wherein determining the plurality of stackable trunk ports comprises selecting all managed stackable trunk ports.

9. A method of provisioning a backbone VLAN as claimed in claim 8, wherein selecting all stackable trunk ports-comprises selecting all managed stackable trunk ports in the associated realm of management.

10. A method of provisioning a backbone VLAN as claimed in claim 8 further comprising de-selecting at least one selected stackable trunk port.

11. A method of provisioning a backbone VLAN as claimed in claim 1, wherein associating each backbone VLAN ID with each one of the corresponding plurality of stackable trunk ports comprises issuing commands to the plurality of stackable trunk ports to enable support for backbone VLAN ID associated communications.

12. A method of provisioning a backbone VLAN as claimed in claim 1, further comprising issuing commands to determine a backbone VLAN provisioning status associated with at least one of a backbone VLAN, a backbone VLAN trunk, a stackable trunk port, a tunnel access port, and a VLAN access port.

13. A method of provisioning a backbone VLAN as claimed in claim 1, further comprising defining at least one switching rule by specifying one of:
   i. a VLAN access port to VLAN access port binding;
   ii. a VLAN access port to VLAN trunk port binding;
   iii. a VLAN access port to stackable trunk port binding;
   iv. a VLAN trunk port to VJAN trunk port binding; and
   v. a tunnel access port to stackable trunk port binding.

14. The method of claim 1 wherein each backbone VLAN ID is managed by a service provider and is independent of a standard VLAN ID.

15. A method of provisioning a backbone VLAN trunk comprising:
   a. obtaining a plurality of backbone VLAN identifiers (IDs) associated with a corresponding plurality of provisioned backbone VLANs; and
   b. associating the plurality of backbone VLAN IDs with the backbone VLAN trunk by
      b1. determining at least one stackable trunk port corresponding to the backbone VLAN trunk; and
      b2. associating the backbone VLAN IDs with the at least one stackable trunk port;
wherein the association of the plurality of backbone VLAN IDs with the backbone VLAN trunk is undertaken irrespective of one of an in-use and a stand-by designation of the backbone VLAN trunk and the at least one stackable trunk port.

16. A method of provisioning a backbone VLAN trunk as claimed in claim 15, wherein obtaining the plurality of backbone VLAN IDs, comprises obtaining backbone VLAN IDs associated with all provisioned backbone VLANs.

17. A method of provisioning a backbone VLAN trunk as claimed in claim 15, wherein obtaining backbone VLAN IDs associated with all provisioned backbone VLANs comprises obtaining backbone VLAN IDs associated with all provisioned backbone VLANS in a realm of management.

18. A method of provisioning a backbone VLAN trunk as claimed in claim 15, further comprising disregarding at least one backbone VLAN ID subsequent to obtaining the plurality of backbone VLAN IDs.

19. A method of provisioning a backbone VLAN trunk as claimed in claim 15, wherein associating the backbone VLAN IDs with the at least one stackable trunk port comprises issuing at least one command to the at least one stackable trunk port to enable support for backbone VLAN ID associated communications.

20. A method of provisioning a backbone VLAN trunk as claimed in claim 15, further comprising issuing commands to determine a backbone VLAN provisioning status associated with at least one of a backbone VLAN, a backbone VLAN trunk, and a stackable trunk port.

21. The method of claim 15 wherein each backbone VLAN ID is managed by a service provider and is independent of a standard VLAN ID.

* * * * *